(12) United States Patent
Bock et al.

(10) Patent No.: US 8,621,305 B2
(45) Date of Patent: Dec. 31, 2013

(54) METHODS SYSTEMS AND APPARATUS FOR DETERMINING WHETHER BUILT-IN-TEST FAULT CODES ARE INDICATIVE OF AN ACTUAL FAULT CONDITION OR A FALSE ALARM

(75) Inventors: Joel Bock, La Mesa, CA (US); Phil Scandura, Flagstaff, AZ (US); Raj Mohan Bharadwaj, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 678 days.

(21) Appl. No.: 12/832,827

(22) Filed: Jul. 8, 2010

(65) Prior Publication Data

US 2012/0011403 A1    Jan. 12, 2012

(51) Int. Cl.
*G01R 31/28* (2006.01)
(52) U.S. Cl.
USPC .......................... 714/733; 714/737; 714/741
(58) Field of Classification Search
None
See application file for complete search history.

(56) References Cited

U.S. PATENT DOCUMENTS

| | | | |
|---|---|---|---|
| 5,293,323 A | 3/1994 | Doskocil et al. | |
| 5,452,442 A * | 9/1995 | Kephart | 714/38.1 |
| 5,463,768 A | 10/1995 | Cuddihy et al. | |
| 5,610,923 A | 3/1997 | Callay | |
| 5,913,023 A * | 6/1999 | Szermer | 714/38.1 |
| 5,919,267 A | 7/1999 | Urnes et al. | |
| 5,937,366 A * | 8/1999 | Zbytniewski et al. | 702/108 |
| 6,073,089 A | 6/2000 | Baker et al. | |
| 6,249,886 B1 * | 6/2001 | Kalkunte | 714/47.3 |
| 6,598,195 B1 * | 7/2003 | Adibhatla et al. | 714/745 |
| 6,643,801 B1 | 11/2003 | Jammu et al. | |
| 6,947,797 B2 | 9/2005 | Dean et al. | |
| 6,988,225 B1 * | 1/2006 | Purdy et al. | 714/49 |
| 7,240,243 B2 * | 7/2007 | Decker | 714/33 |
| 7,315,805 B2 | 1/2008 | Slater | |
| 7,415,328 B2 | 8/2008 | Volponi | |
| 7,418,366 B2 | 8/2008 | Tonack et al. | |
| 7,966,521 B2 * | 6/2011 | Bussa et al. | 714/25 |
| 2007/0294591 A1 | 12/2007 | Usynin et al. | |
| 2008/0291018 A1 | 11/2008 | Dacier et al. | |
| 2009/0313505 A1 | 12/2009 | McCroskey et al. | |

* cited by examiner

*Primary Examiner* — Daniel McMahon
(74) *Attorney, Agent, or Firm* — Ingrassia Fisher & Lorenz, P.C.

(57) ABSTRACT

Methods and apparatus are provided for determining whether a built-in-test fault code (BITFC) data sequence generated by a built-in-test (BIT) of a particular module of a complex system is indicative of an actual fault condition. A regression function is generated for the particular module based on stored BITFC data sequences generated by the BIT and stored repair data for that module from a fault history database. Later, during operation of the particular module, the BIT generates a new BITFC data sequence. A processor can then load the new BITFC data sequence and execute the regression function with respect to the new BITFC data sequence to determine whether the new BITFC data sequence is indicative of an actual fault condition at the particular module or is indicative of a false fault condition at the particular module.

16 Claims, 7 Drawing Sheets

METHODS SYSTEMS AND APPARATUS FOR DETERMINING WHETHER BUILT-IN-TEST FAULT CODES ARE INDICATIVE OF AN ACTUAL FAULT CONDITION OR A FALSE ALARM

TECHNICAL FIELD

The disclosed embodiments generally relate to computer-based methods for pattern recognition and/or data mining in a complex system, and more particularly relate to identifying or detecting legitimate faults in a module implemented as part of a complex system based on groups of built-in-test (BIT) fault code data generated by that module.

BACKGROUND

A complex system, such as an electrical plant or a vehicle such as a ship, aircraft or spacecraft, includes many different modules. In such complex systems it is desirable to identify adverse events, such as faults, failures or other malfunctions, which might be occurring in one or more of its modules.

One common approach that is used to identify adverse events that might be occurring in one or more of the modules of a complex system is to use one or more built-in tests (BITs) at each module. A BIT is a diagnostic test used to determine whether a particular function of a module is operating correctly. Functions tested may be characteristic of software or hardware or both. In general, a BIT generates one of two binary results: either a pass result or fail result. A pass result is generated by the BIT when there is no indication that a problem is occurring in that particular module. By contrast, a fail result (sometimes referred to as a BIT fault or a BIT fault code) is generated by the BIT when there is an indication that a problem is occurring in that particular module. For example, when the complex system is a vehicle (e.g., aircraft or spacecraft), a vehicle health monitoring system(s) can be implemented that monitors data generated by BITs of the vehicle's modules and to identify adverse events that might be occurring in one or more of the modules. In the context of an aircraft BITs can be implemented at avionics modules or line replaceable units (LRUs) to detect a fault condition.

In many systems, a BIT will generate a fail result (or BIT fault code) that is misleading, incorrect or otherwise in error. In such cases, a false alarm is generated that indicates that a problem is occurring in that particular module when, in reality, no problem is actually occurring in that particular module. These erroneous BIT fault codes often result in unnecessary or misdirected corrective actions that are very costly. For instance, in one example where the complex system is an aircraft, an erroneous fail result can cause disassembly of large sections of the aircraft so that technician can get access to the allegedly faulting module, only to learn that it is actually operating correctly. BITs implemented at avionics modules are notoriously unreliable since they often generate BIT fault codes that are incorrect or misleading. For example, BIT fault codes will often indicate that a fault is found or that a malfunction is present, but upon teardown and inspection, it is often found that no true fault is actually occurring. The avionics system provider will typically have to service the faulty system and take what amounts to unnecessary corrective action. This results in unnecessary cost to product consumers as well as the avionics system provider.

There is a need for methods and systems that can confidently predict when a BIT fault code is likely to be incorrect or misleading versus when a BIT fault code is likely to be accurate or correct (i.e., a true fault).

One approach is to maintain a database of diligent records that record, for each BIT fault code, an indication of whether the BIT fault code was valid/accurate or was invalid/inaccurate/misleading. For example, for a particular BIT fault code, a corresponding indicator of fault found (FF) or no fault found (NFF) can be recorded. A fault found (FF) indicator can be logged when a particular BIT fault code is legitimate (i.e., corresponds to an actual fault condition and an appropriate corrective action was needed), and a no fault found (NFF) indicator can be logged when a particular BIT fault code was illegitimate (i.e., corresponds to false alarm and corrective action was not needed). Over time a log of true BIT fault codes and false BIT fault codes is compiled.

Once a database of such records is built, an analyst can then manually inspect the records and determine whether a particular BIT fault code is likely to correspond to an actual fault condition or a false alarm. Once this determination has been made, the person can then make an educated guess as to whether or not corrective action needs to be taken with respect to the particular module that generated the BIT fault code (e.g., whether it need to be inspected, repaired, serviced, etc).

One drawback of this approach is that it is time-consuming endeavor particularly as the number of modules in a complex system increases since an analyst must study old BIT fault code error logs and determine which BIT fault codes are reliable or not. It also requires that the analyst have a lot of knowledge regarding what BIT fault code data is reliable or not, and is subject to human error in interpreting that data. Another drawback is that in many cases the determination of whether a particular module is not operating correctly is based on consideration of a single BIT fault code generated by a BIT.

Notwithstanding these advances, it is desirable to provide improved analysis systems for use with such complex systems that can discriminate between legitimate BIT fault codes that are accurate or valid, and those that are invalid, inaccurate or misleading (i.e., false alarms). Furthermore, other desirable features and characteristics of the present invention will become apparent from the subsequent detailed description of the invention and the appended claims, taken in conjunction with the accompanying drawings and this background of the invention.

BRIEF SUMMARY

Methods and apparatus are provided for determining whether a built-in-test fault code (BITFC) data sequence generated by a built-in-test (BIT) of a particular module of a complex system is indicative of an actual fault condition. In one implementation, the complex system can be, for example, an aircraft and the particular module is an avionics module of the aircraft. The built-in-test (BIT) is executed at the particular module to perform a particular diagnostic test with respect to that particular module to determine whether that particular module is operating correctly. The BIT generates a BIT fault code when the particular module is determined not to be is operating correctly. The BITFC fault code data sequence comprises BIT fault codes generated by the BIT.

A regression function (e.g., a logistic regression function) is generated for the particular module based on stored built-in-test fault code (BITFC) data sequences generated by the BIT and stored repair data for that module from a fault history database. The repair data comprises actual fault condition found (FF) result data and no fault condition found (NFF) result data corresponding to the stored BIT fault code data sequences for the particular module. The actual fault condition found (FF) result data indicates that a particular BIT fault code data sequence generated by the BIT corresponded to an actual fault condition found (FF) result, whereas the no fault condition found (NFF) result data indicates that the particular BIT fault code data sequence generated by the BIT corresponded to a false alarm (NFF) result.

The regression function correlates some particular ones of the BITFC data sequences with a finding of an actual fault condition found (FF) result at the particular module, and correlates other particular ones of the BITFC data sequences with a finding of no fault condition found (NFF) result at the particular module.

Later, during operation of the particular module, the BIT generates a new BITFC data sequence. A processor can then load the new BITFC data sequence and execute the regression function with respect to the new BITFC data sequence to generate either (1) a no-fault found (NFF) result that indicates that the new BITFC data sequence is not indicative of an actual fault condition at the particular module, or (2) a fault found (FF) result that indicates that the new BITFC data sequence is indicative of an actual fault condition at the particular module. This way it can be determined whether the new BITFC data sequence is indicative of an actual fault condition at the particular module or is indicative of a false fault condition at the particular module.

In accordance with one embodiment, a processor processes the stored BIT fault code data sequences and the repair data to generate sorted words that are sorted by length and frequency. Each word corresponds to a plurality of symbols that are part of a symbol sequence, where each symbol corresponds to a particular BIT fault code. Each word ranges between two and n symbols in length, where n is an integer. In other words, a word has a length greater than or equal to two symbols. The sorted words can then be used to generate feature vectors. The feature vectors include a first feature vector for a first data class that corresponds to the no fault condition found (NFF) result data, and a second feature vector for a second data class that corresponds to actual fault condition found (FF) result data. The regression function can then be generated based on the feature vectors, and stored in memory for subsequent use in analyzing the new BITFC data sequence.

In one implementation of this embodiment, the processor maps each unique BIT fault code in the stored BIT fault code data sequences to a corresponding symbol to generate a symbol sequence based on the stored BIT fault code data sequences. The processor then segments or partitions the symbol sequence into sets of words. Each set of words includes words that comprise a different particular number of consecutive symbols of the symbol sequence. The processor then counts a number of occurrences of each word in the symbol sequence to generate word counts for each word. Then, for each set of words, the processor sorts the word counts by the number of occurrences in descending order, and converts the sorted word counts to sorted word frequencies. Each word frequency is the frequency of occurrence of each word in the symbol sequence. The processor can then concatenate sorted words that correspond to the first data class to generate the first feature vector that corresponds to no-fault condition found (NFF) result data, and can concatenate other sorted words that correspond to the second data class to generate the second feature vector that corresponds to actual fault condition found (FF) result data.

Based on the first feature vector, the processor generates parameters for the regression function that predict likelihood of a no fault found (NFF) at the particular module when words of the first data class, that correspond to particular BITFC data sequences indicative of no-fault condition found (NFF) result data, are input to the regression function. The no fault condition found (NFF) result data indicates that the particular BIT fault code data sequence generated by the BIT corresponded to a false alarm (NFF) result.

Similarly, based on the second feature vector, the processor generates other parameters for the regression function that predict likelihood of an actual fault condition at the particular module when words of the second data class, that correspond to particular BITFC data sequences indicative of actual fault condition found (FF) result data, are input to the regression function. The actual fault condition found (FF) result data indicates that a particular BIT fault code data sequence generated by the BIT corresponded to an actual fault condition found (FF) result.

BRIEF DESCRIPTION OF THE DRAWINGS

The present invention will hereinafter be described in conjunction with the following drawing figures, wherein like numerals denote like elements.

DETAILED DESCRIPTION

Figure 1:
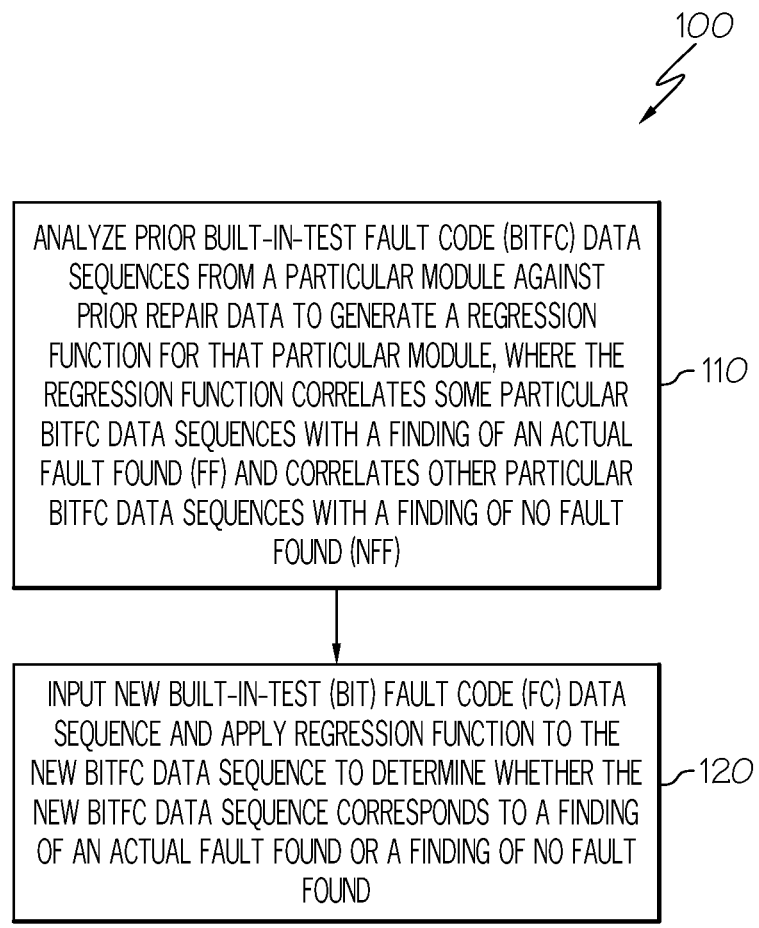
FIG. 1 illustrates a method in accordance with some of the disclosed embodiments.

The following detailed description is merely exemplary in nature and is not intended to limit the invention or the application and uses of the invention. As used herein, the word "exemplary" means "serving as an example, instance, or illustration." Any embodiment described herein as "exemplary" is not necessarily to be construed as preferred or advantageous over other embodiments. Furthermore, there is no intention to be bound by any theory presented in the preceding background or the following detailed description.

Terminology

Throughout this disclosure certain terms are referenced that will be defined as follows.

As used herein, the term "module" can refer to a subsystem or component of a complex system. A module can be a hardware module, a software module or a combination thereof. As used herein the term "hardware module" can refer to a device, a circuit, an electrical component, or other hardware-based component for performing a task, whereas a "software module" can refer to a software-based component for performing a task.

As used herein, a built-in-test (BIT) refers to a test that is run or executed at a particular module of a complex system to determine whether some characteristic/feature/function of that module is operating correctly or incorrectly. A particular module can run one or more BITs. Each BIT is run (e.g., during boot-up or operation of the particular module) to perform a particular diagnostic test with respect to that particular module to determine whether that particular module is operating correctly. As a particular BIT executes it generates BIT results (e.g., pass/fail). In some implementations, the BIT results generated by each BIT can be downloaded to a computer after operation (e.g., post-flight in the example where the BITs are running at an avionics module), or analyzed in real-time by a computer (e.g., an on-board flight computer).

When a particular BIT determines that the particular module is not operating correctly, the BIT can generate a particular BIT fault code (FC). As used herein, the term "BIT fault code" refers to a code generated by a BIT when the BIT determines that the test has failed. A particular module can generate many different BIT FCs (one for each BIT that it runs) to indicate different problems that might be occurring at that particular module. The BIT FCs are unique for each BIT and each particular module.

As used herein, the term "symbol" refers to an identifier that corresponds to a particular BIT fault code. As used herein, a symbol sequence refers to a sequence of symbols.

As used herein, the term "word" refers to a group or subsequence of BIT fault code symbols that are part of a symbol sequence. Each word has a "length." As used herein, the term "word length" refers to a number of symbols in a particular word.

As used herein, the term "a no-fault found (NFF)" can refer to an indicator that a particular BIT fault code or sequence is determined to be illegitimate (i.e., corresponds to false alarm and corrective action was not needed). In some of the disclosed embodiments, a no-fault found (NFF) result is an indicator that the new BIT fault code sequence was illegitimate and corrective action is needed.

As used herein, the term "fault found (FF)" can refer to an indicator that a particular BIT fault code or sequence is legitimate (i.e., corresponds to an actual fault condition that requires further inspection or appropriate corrective action). In some of the disclosed embodiments, a fault found (FF) result is an indicator that the new BIT fault code sequence is legitimate and corresponds to an actual fault condition that should be inspected further.

Overview

FIG. 1 illustrates a method 100 in accordance with some of the disclosed embodiments. In accordance with the disclosed embodiments, at step 110 of method 100, prior built-in-test fault code (BITFC) data sequences from a particular module are analyzed against prior repair data to generate a regression function for that particular module. The regression function correlates some particular BITFC data sequences with a finding of an actual fault found (FF) and correlates other particular BITFC data sequences with a finding of no fault found (NFF). For instance, in one implementation, method 100 utilizes sequences of BIT fault codes from the module and the database of shop repair records to develop a predictive logistic regression function, based on the most frequently-observed sequences from NFF and FF data classes, that corresponds to a particular module of a complex system.

Once the regression function has been developed it can then be used or applied, at step 120, to intelligently and rapidly analyze a new sequence of BIT fault code data produced during operation of the particular module, and to predict whether a new sequence of BIT fault code data corresponds to or is indicative of (1) a finding of an actual fault condition (e.g., a FF result) or (2) a finding of a false alarm (e.g., a NFF result). Thus, prior to inspection and repair by maintenance personnel, the regression function can be used to estimate whether or not the new discrete BIT fault code sequence is likely to result in a corresponding fault. In other words, this regression function can subsequently be used to predicatively determine whether a BIT for a particular module of a complex system is operating correctly and generating a BIT fault code data that corresponds to an actual fault condition, or whether it is generating BIT fault code data that corresponds to a false alarm. When the sequence of BIT fault code data is deemed reliable and indicative of an actual fault condition (e.g., a FF result), then the corresponding module can be inspected, serviced and/or repaired. However, when the sequence of BIT fault code data is deemed unreliable and indicative of a false alarm (e.g., a NFF result), then it can be ignored without going through the effort to inspect, service and/or repair the corresponding module thereby reducing costs. In addition, these results can be used to re-design the BIT itself so that false alarms can be reduced in the future.

The actual processing carried out by the regression functions in accordance with the disclosed embodiments is computationally efficient, and can be applied in real-time applications. As such, in some implementations, these regression functions can be implemented in an embedded processor, or rapidly-executing offline processor, to help support decision making as to whether or not inspection/repair/servicing of the corresponding module is actually warranted. In one non-limiting, exemplary implementation, in an avionics environment the regression functions can be used for embedded or on-wing computations to support Condition Based Maintenance (CBM) decision making.

Before describing in detail embodiments that are in accordance with the present invention, it should be observed that the embodiments reside primarily in combinations of method steps and apparatus components related to analysis of BIT fault code data. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for analysis of BIT fault code data, as described herein. For instance, in one implementation the modules can be implemented as software that runs on a microprocessor or microcomputer. As such, these functions may be interpreted as steps of methods for analysis of BIT fault code data. Alternatively, some or all functions could be implemented by a state machine that has no stored program instructions, or in one or more ASICs, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 2:
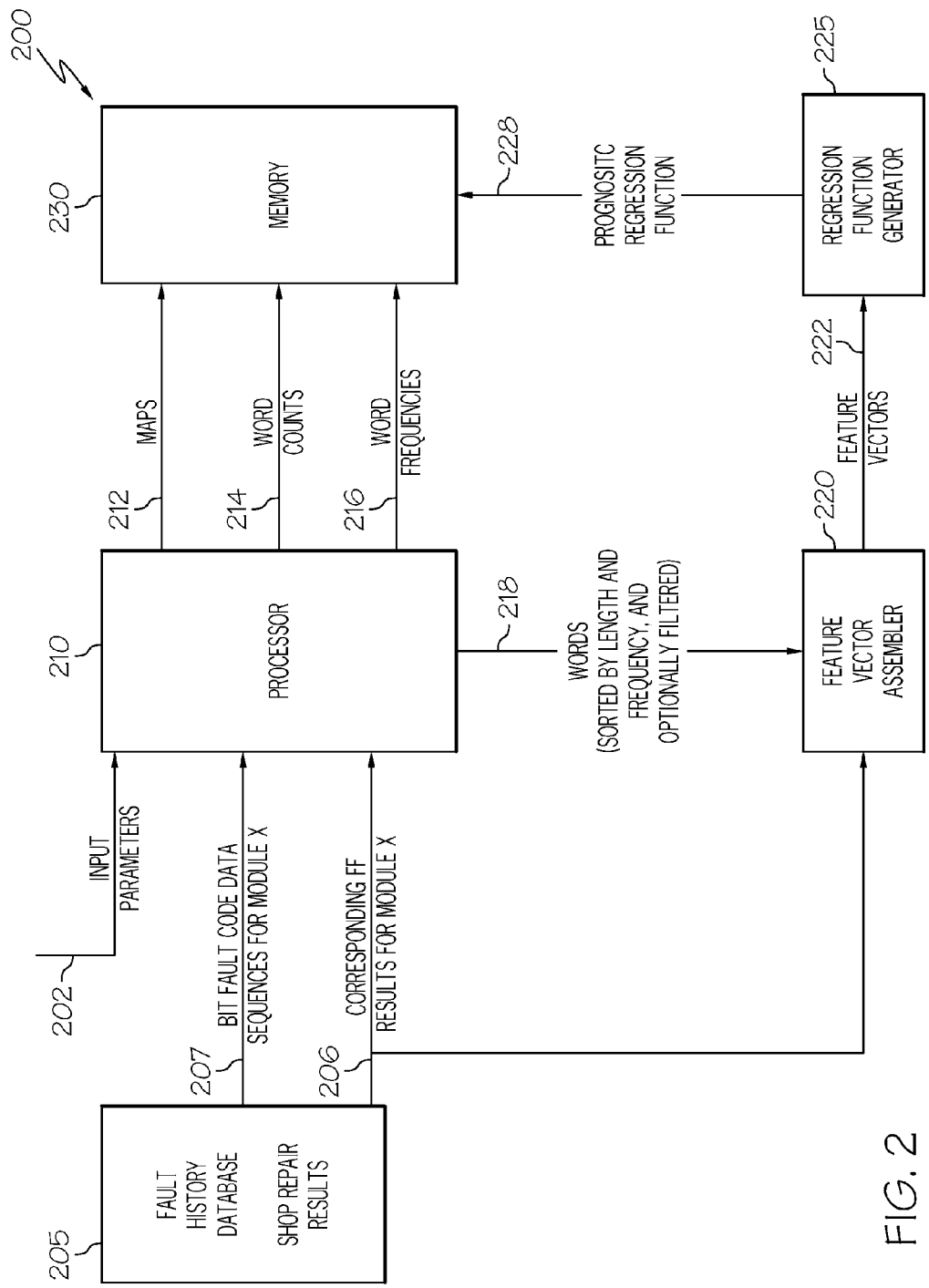
FIG. 2 is a block diagram that illustrates a computing system in accordance with some of the disclosed embodiments.

FIG. 2 is a block diagram that illustrates a computing system 200 in accordance with some of the disclosed embodiments. The computing system 200 comprises a fault history database (FHDb) 205, a processor 210, a feature vector assembler 220, a regression function generator 225, and a memory 230.

The fault history database 205 includes two sets of data: BIT fault code data sequences (M, P) 207 from the particular module, and FF/NFF result data 206. BIT fault code data sequences (M, P) 207 are BIT fault codes generated by a BITs that run/execute at a particular module. BIT fault code data sequences (M, P) 207 are compiled over time and stored in the fault history database 205. FF/NFF result data 206 that is generated by technologists, for example, after inspection of the particular module. The FF/NFF result data 206 indicates whether a particular BIT fault code generated by a particular BIT corresponded to an actual fault found (FF) result, or whether the particular BIT fault code generated by a particular BIT corresponded to a false alarm (NFF) result. The FF/NFF result data 206 is complied over time and stored in the fault history database 205.

Processor 210 is communicatively coupled to the FHDb 205 and memory 230 using any known technique. As will be described in greater detail below, the FHDb 205 provides BIT fault code data sequences 207 for a particular module and corresponding FF/NFF results 206 for that particular module to the processor 210. The processor 210 uses this information along with input parameters 202 to generate maps 212, word counts 214, word frequencies 216 that are then stored in memory 230. The processor 210 also generates words 218 that are sorted by length and frequency. Each word is a group or sub-sequence of BIT fault code symbols that are part of a symbol sequence, where each symbol corresponds to a particular BIT fault code.

The feature vector assembler 220 utilizes the sorted words and FF/NFF result data 206 to generate or assemble feature vectors 222 for each data class. In other words, the feature vectors 222 are created based on historical word frequencies as well as current data. In one implementation, data class 1 (C1) may correspond to NFF result data, and data class 2 (C2) may correspond to actual FF result data. The regression function generator 225 uses feature vectors 222 to generate prognostic regression function(s) 228 that are then stored in memory 230 for subsequent use in analyzing new sequences of BIT fault codes. Further details regarding the operation of the computing system 200, including of processing performed at the feature vector assembler 220 and the regression function generator 225, will now be described in greater detail with reference to FIGS. 3-5.

Figure 3:
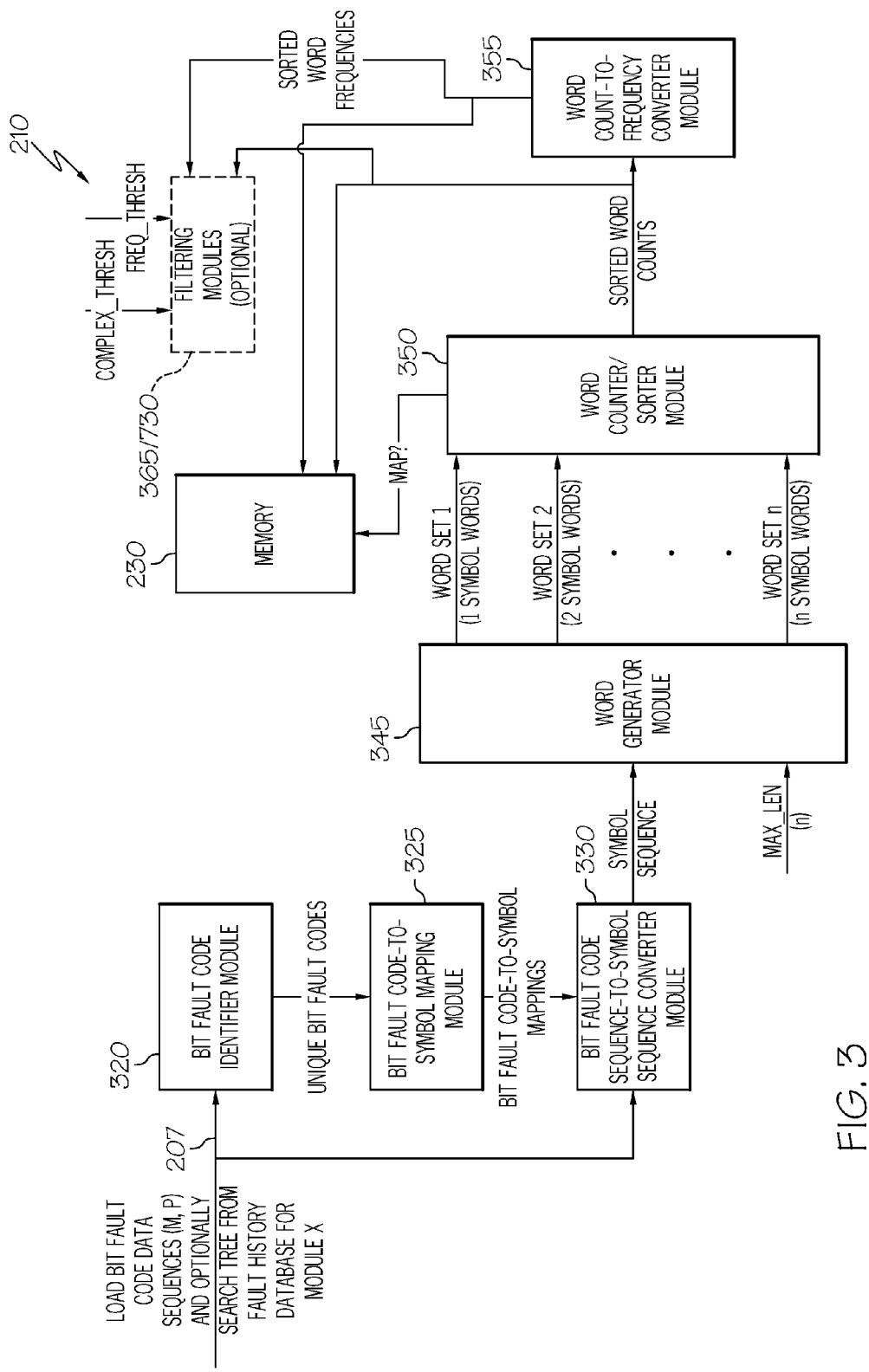
FIG. 3 is a block diagram that illustrates modules of the processor of computing system in accordance with some of the disclosed embodiments.

FIG. 3 is a block diagram that illustrates modules of the processor 210 of computing system 200 in accordance with some of the disclosed embodiments.

Modules implemented at the processor 210 include a BIT fault code identifier module 320, a BIT fault code-to-symbol mapping module 325, a BIT fault code-to-symbol sequence converter module 330, a word generator module 345, a word counter/sorter module 350, a word count-to-frequency converter module 355, and a optional filtering modules 365, 370. FIG. 3 also illustrate memory 230 to show where various outputs generated by the word counter/sorter module 350 and the word count-to-frequency converter module 355 are stored. Further details regarding each of the modules in FIG. 3 will now be described with reference to FIG. 4.

Figure 4:
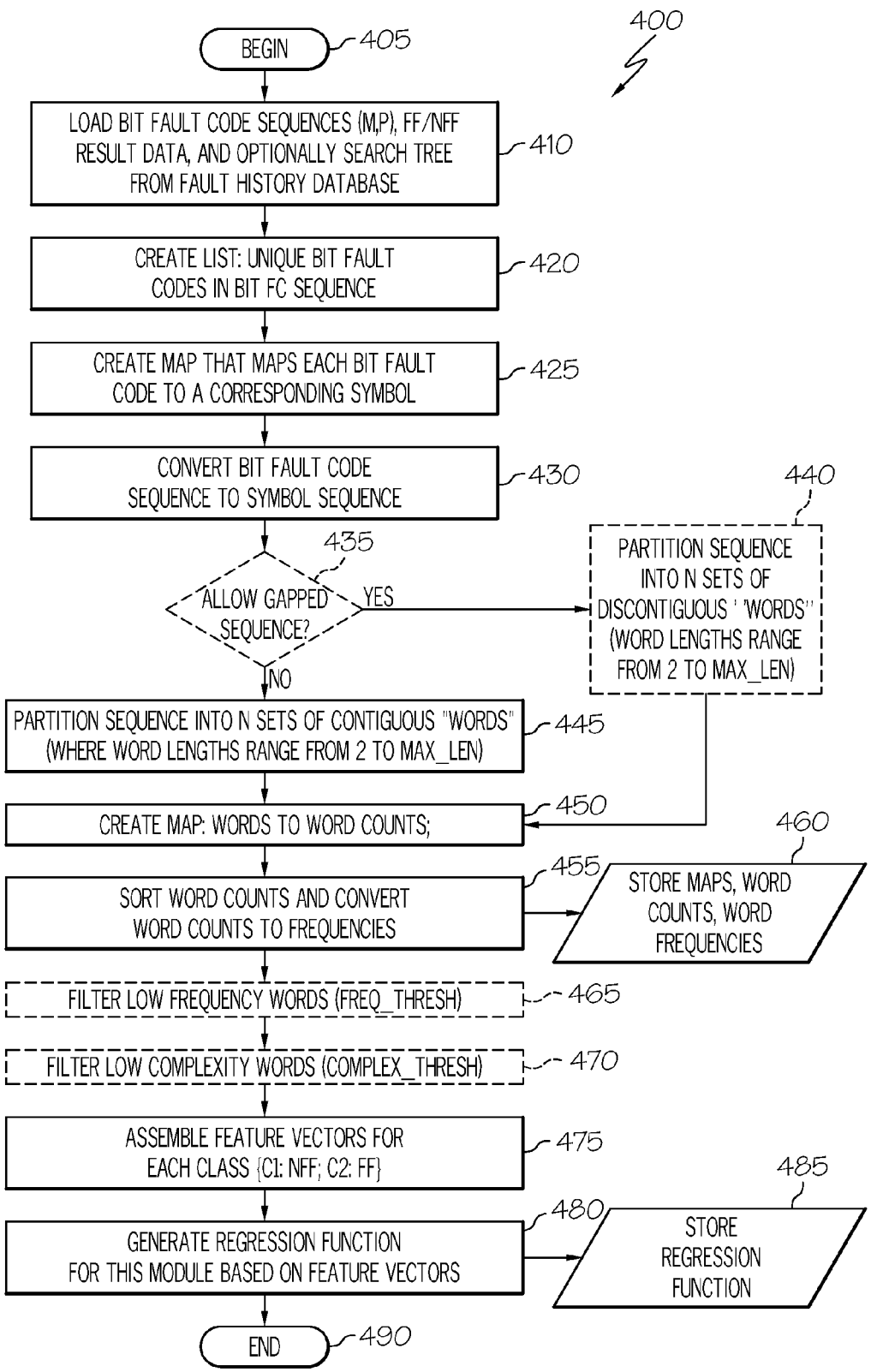
FIG. 4 is a flow chart that illustrates a method performed by the computing system of FIGS. 2 and 3 in accordance with some of the disclosed embodiments.

FIG. 4 is a flow chart that illustrates a method 400 performed by the computing system 200 of FIGS. 2 and 3 to generate maps 212, word counts 214, word frequencies 216 and prognostic regression function(s) 228 in accordance with some of the disclosed embodiments. FIG. 3 and FIG. 4 will now be described.

The method 400 begins at 405 where input parameters 202 are specified. In one implementation, the input parameters can include one or more module identifiers (M) each of which identify a particular module (e.g., graphics module, flight control module, etc.), one or more part identifiers (P) each of which identify a particular part, a maximum word length (MAX_LEN) that specifies a maximum word length as a number of symbols, an optional minimum word frequency threshold (FREQ_THRESH), and an optional word complexity threshold (COMPLEX_THRESH). The part identifiers (P) are optional, but can be used to track the relationship between a particular module and particular parts of that module.

At step 410, BIT fault code data sequences (M, P) 207 and FF/NFF result data 209 (that have been complied over time) are loaded into processor 210 from the fault history database 205. Optionally a search tree from the fault history database 205 can also be loaded; the search tree is a data structure that facilitates rapid querying, and may itself be considered as a type of database.

At step 420, the BIT fault code identifier module 320 determines a list of different, unique BIT fault codes for that particular module from the BIT fault code data sequences (M, P) 207 that were loaded at step 410. In some cases, the list of unique BIT fault codes may include all of the different BIT fault codes generated by the particular module, but does not necessarily have to when the one or more BIT fault codes for particular BIT(s) have not been generated. In some scenarios, when the BIT fault code data sequences (M, P) 207 include redundant BIT fault codes that keep occurring within the BIT fault code data sequences (M, P) 207, the BIT fault code identifier module 320 can be used to eliminate this redundancy.

Each unique BIT fault code is generally represented by a complex identifier (e.g., string of numbers, letters, etc.). It is desirable to simplify these unique BIT fault codes, and represent each one using a symbol. The BIT fault code identifier module 320 provides the unique BIT fault code to the BIT fault code-to-symbol mapping module 325, and at step 425, the BIT fault code-to-symbol mapping module 325 generates a fault code-to-symbol map that maps each unique BIT fault code (that was determined at step 420) to a corresponding symbol. Each symbol is a shorthand way of representing a corresponding BIT fault code (e.g., map a long number that represented a particular BIT fault code to a letter).

The BIT fault code-to-symbol mapping module 325 provides the BIT fault code-to-symbol mappings to the BIT fault code-to-symbol sequence converter module 330. At step 430, the BIT fault code-to-symbol sequence converter module 330 uses the fault code-to-symbol map to convert the fault code sequences (M, P) 207 (that were loaded at step 410) into a sequence of symbols. This way the data that was input at step 410 can be simplified to simplify processing that takes place after step 430.

In some of the disclosed embodiments, optional steps 435 and 440 can be performed. To avoid confusion, steps 435 and 440 will be described below after the remainder of method 400 is described.

When the processor 210 determines that a gapped symbol sequence is not permitted (at step 435), the method 400 proceeds to step 445, where the word generator module 345 disregards any gaps that are present in the symbol sequence and segments/partitions the symbol sequence into N sets of contiguous words, where word lengths range from two symbols to the parameter maximum word length (MAX_LEN). For example, in FIG. 3 word set 1 would include one symbol words (i.e., words on length 1 symbol), word set 2 would include two symbol words (i.e., words on length 2 symbols), ..., and word set n would include n symbol words (i.e., words on length n symbols).

For instance, in one simplified, non-limiting example, when the maximum word length (MAX_LEN) is set to three and the symbol sequence includes four symbols {A, B, C, D}, the processor 210 takes the symbol sequence and segments the symbol sequence into four sets of contiguous words. In the first set of contiguous words, the symbol sequence is segmented into four words or symbol sub-sequences that are each one symbol in length (i.e., A, B, C, D). In an embodiment where gapped symbol sequences are not permitted, in the second set of contiguous words, the symbol sequence is segmented/partitioned into three words that are each two symbols in length (i.e., a second symbol sub-sequence AB, BC, CD), and in the third set of contiguous words, the symbol sequence is segmented/partitioned into two words that are each three symbols in length (i.e., ABC, BCD). By contrast, in an embodiment, where gapped symbol sequences are permitted, in the second set of contiguous words, the symbol sequence is segmented/partitioned into 6 words that are each two symbols in length (i.e., a second symbol sub-sequence AB, AC, AD, BC, BD, CD). In the third set of contiguous words, the symbol sequence is segmented/partitioned into four words that are each three symbols in length (i.e., ABC, ABD, ACD, BCD).

After segmenting/partitioning at step 440, the method 400 proceeds to step 450. At step 450, the word counter/sorter module 350 generates a word-to-word count map that maps each of the words (generated at step 440 or step 445) to word counts. The word counts specify how often each word (generated at step 440 or step 445) occurs in the symbol sequence. As will be described below, this way the processor 210 can determine the frequency of occurrence of each word over all of the BIT fault code sequences that are input at step 410.

At step 455, for each set of words of a particular word length, the word count-to-frequency converter module 355 sorts the word counts by the number of occurrences of each word (e.g., sorts words in descending order from the most frequently occurring words to least frequently occurring words), and then converts the sorted word counts to sorted word frequencies (e.g., word counts divided by total number of words). In other words, the word frequency can be determined by dividing the count of words of a particular length (J) in the current word set by the count of all words of the particular length (J) in the database. The word frequencies represent the frequency of occurrence of each word in the symbol sequence. At step 460, processor 210 stores the word-to-word count map, the words counts, and the word frequencies in memory 230.

In some of the disclosed embodiments, optional steps 465 and 470 can be performed at optional filtering module 365, 370.

At optional step 465, a filtering module 365 filters low frequency words by comparing the word frequencies for each word to the minimum word frequency threshold (FREQ_THRESH) and discarding any words having a corresponding word frequency that is less than the minimum word frequency threshold (FREQ_THRESH). This way low frequency words can be eliminated from the data that is used by the feature vector assembler 220. The minimum word frequency threshold (FREQ_THRESH) is a number that can be determined empirically for each module.

At optional step 470, another filtering module 370 filters low complexity words by comparing the word complexity of each word to the word complexity threshold (COMPLEX_THRESH) and discarding any words having a corresponding word complexity that is less than the word complexity threshold (COMPLEX_THRESH). This way, low complexity symbol sequences providing little or no analytic information may be filtered out by selecting the value of a complexity threshold parameter.

As noted above, each word has a length that is a number of symbols, and a relative frequency of occurrence. Prior to step 475, the words have been sorted according to word length and relative frequency, and then at step 475, the feature vector assembler 220 uses the sorted words to generate feature vectors at step 475. More specifically, the feature vector assembler 220 assembles feature vectors C1, C2 representing each data class by concatenating the sorted words corresponding to each class. In other words, the sorted words are appended end-to-end to generate the feature vector. Class 1 (C1) corresponds to a no-fault found (NFF) class that is used to specify when a particular BIT fault code data sequence has previously been found to be illegitimate (i.e., corresponds to false alarm that did not actually require corrective action), and class 2 (C2) corresponds to a fault found (FF) class that is used to specify when a particular BIT fault code data sequence has previously been found to be legitimate (i.e., to correspond to an actual fault condition that requires corrective action).

Figure 5:
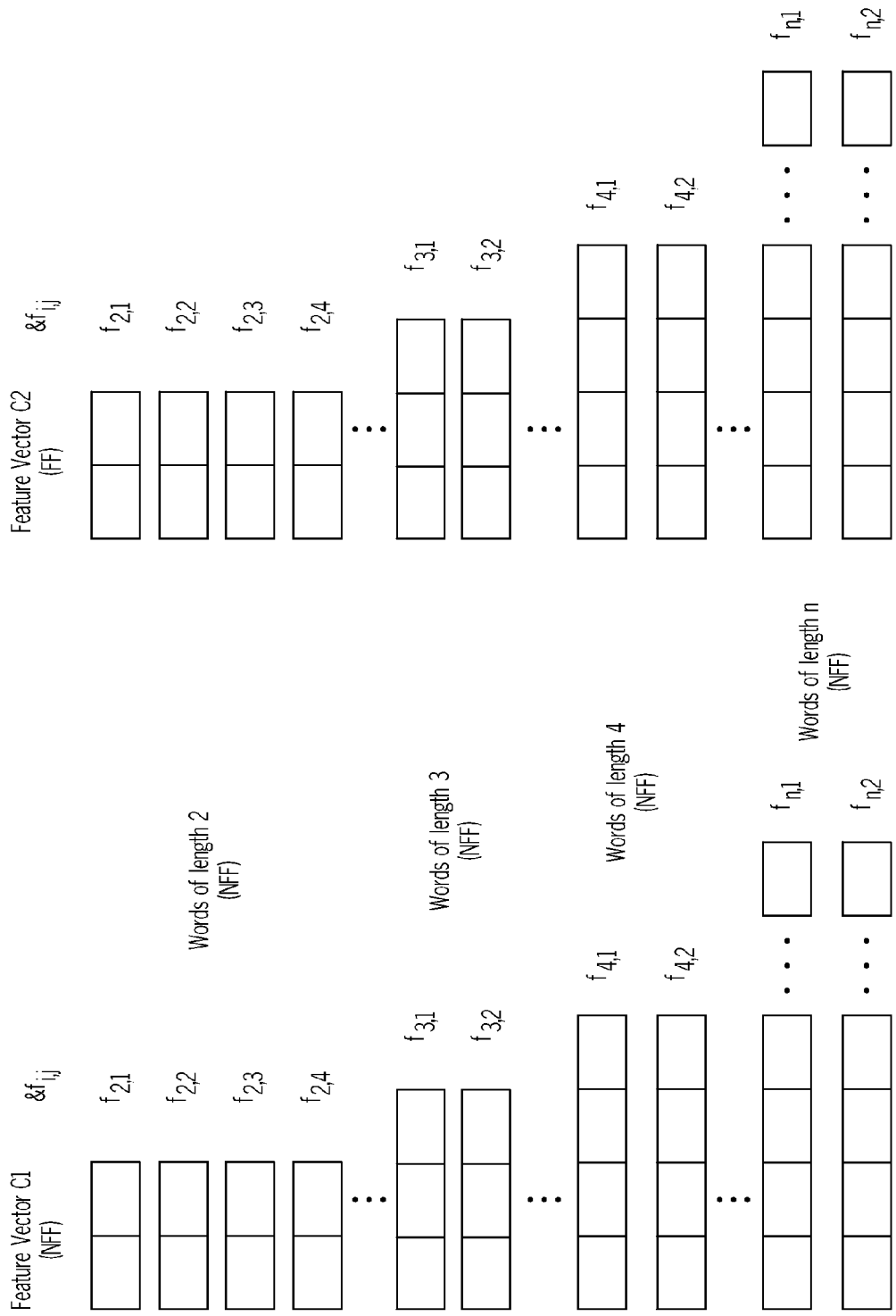
FIG. 5 illustrates assembly the feature vectors in accordance with some of the disclosed embodiments.

FIG. 5 illustrates assembly the feature vectors C1, C2. In FIG. 5, each word is represented using the notation $f_{i,j}$, where i is the word length in number of symbols and j is the relative word frequency (jth most frequent i-letter word for that class). The highest frequency word for a specific word length has a j value of 1, the second highest frequency word for a specific word length has a j value of 2, the third highest frequency word for a specific word length has a j value of 3, etc. For instance, $f_{2,3}$ represents a word having a word length of 2 symbols that is determined to be the third most frequently occurring word in the set of words that are two symbols in length. Similarly, $f_{n,1}$ represents a word having a word length of n symbols that is determined to be the first most frequently occurring word in the set of words that are n symbols in length (or the maximum word length (MAX_LEN)). Thus, the feature vector C1 would be the concatenation of words $f_{i,j}$, belonging to class 1, where i is the word length in number of symbols and j is the relative word frequency from highest frequency to lowest frequency. The value i can range from any integer less than n to n, where n is the value of the parameter maximum word length (MAX_LEN).

At step 480, regression function generator 225 generates a regression function for the module based on the corresponding feature vectors C1, C2 generated at step 475. In one embodiment, the regression function generator 225 uses the feature vectors C1, C2 to compute parameters of a regression function that will predict the likelihood of an actual fault condition based on a particular new BIT fault code data sequence that is applied to the regression function. The regression function generated at step 475 can be generated using any known regression analysis methods for computing regression function including, linear regression analysis, such as ordinary least squares regression analysis, or non-linear regression analysis, etc. Any common statistical software package (i.e., suite of computer programs that are specialized for statistical analysis) can be utilized by an analyst to generate the regression function. In one embodiment, the regression function is a logistic regression function. The analyst may selectively weight certain fault code sequences (or words) in a particular application that are known to be problematic or of specific interest by increasing their weight to increase their influence) in the regression function, or conversely, reducing their weight to reduce their influence) in the regression function. As will be described below, the regression function can subsequently be used to predict whether or not new BIT fault code sequences correspond to (1) actual fault conditions (e.g., FF) or (2) false alarms (e.g., NFF). In essence, the regression function for a specific module predicts the data class associated with explanatory variables that are sequences of fault codes produced by that module.

At step 485, the regression function generated at step 480 is stored in memory 230. The method 400 then ends at step 490. Although not explicitly illustrated in FIG. 4, the method 400 can be repeated each time new BIT fault code data sequences (M, P) 207 and/or FF/NFF result data 209 is collected to easily and regularly update the regression function so that over time it converges. This way offline updates of the word frequencies, for example, can be made as new data is acquired from the module.

As noted above, in some of the disclosed embodiments, optional steps 435 and 440 can be performed. At optional step 435, processor 210 determines whether a gapped symbol sequence is permitted. As used herein, a "gapped symbol sequence" refers to a symbol sequence that includes one or more gaps between symbols in the symbol sequence. This allows for patterns to be accounted for that may include embedded noise sequences, and for the possibility of informative BIT sequences that are characterized by intermittency, such as a non-periodically occurring fault, for example. When the processor 210 determines that a gapped symbol sequence is permitted (at step 435), the method 400 proceeds to step 440, where the processor 210 segments/partitions the gapped symbol sequence into a set of n discontiguous words. The method 400 proceeds to step 450 where processing continues as described above.

Figure 6:
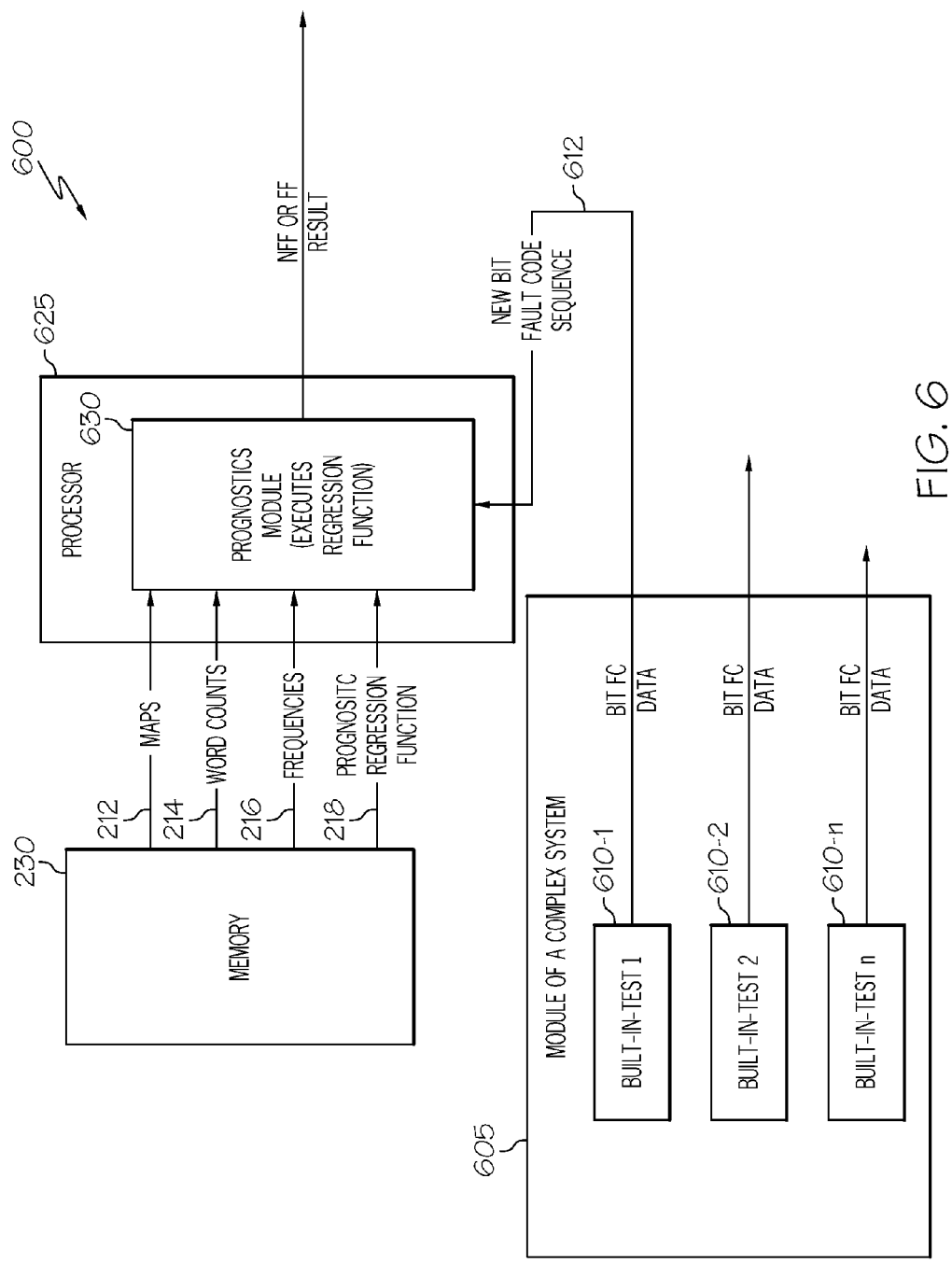
FIG. 6 is a block diagram that illustrates a system in accordance with some of the disclosed embodiments.
Figure 7:
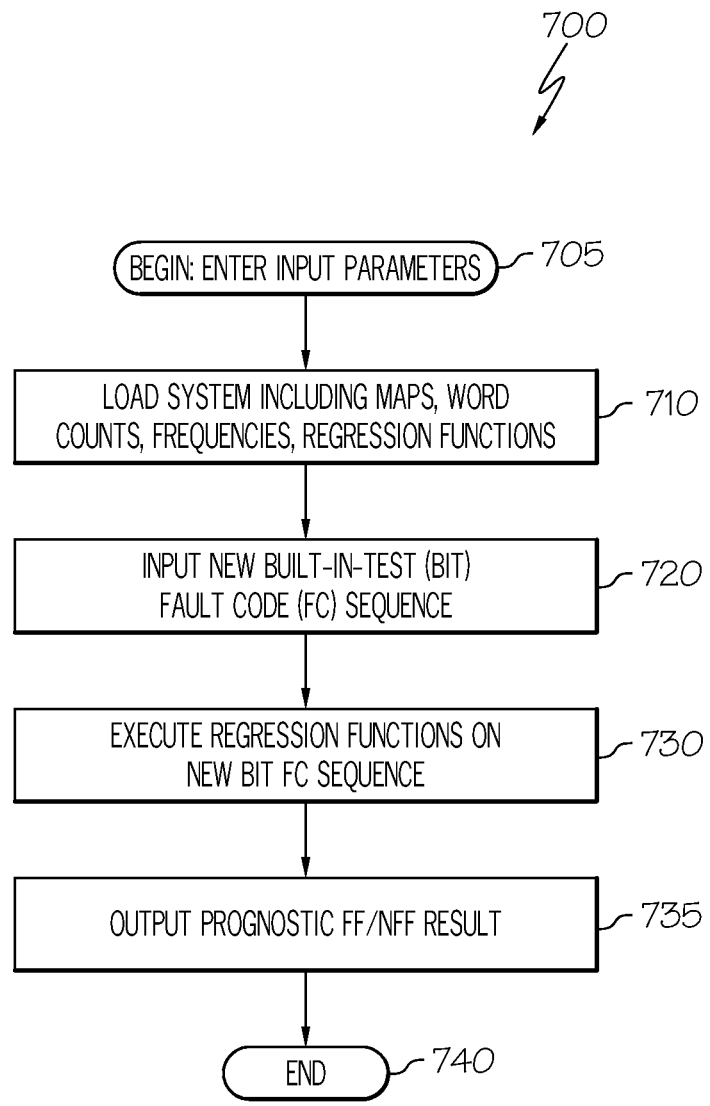
FIG. 7 is a flow chart that illustrates a method for using a regression function to predict whether a new BIT fault code sequence is indicative of a fault condition at a particular module in accordance with some of the disclosed embodiments.

FIG. 6 is a block diagram that illustrates a system 600 in accordance with some of the disclosed embodiments. The system 600 comprises a particular module 605 of a complex system, memory 230 and a processor 625 that includes a prognostics module 630. The prognostics module 630 executes the regression function that was previously generated. Operation of the system 600 will be now be described with reference to FIG. 7. FIG. 7 is a flow chart that illustrates a method 700 for using a regression function to predict whether a new BIT fault code sequence 612 is indicative of a fault condition at a particular module in accordance with some of the disclosed embodiments.

Method 700 begins at step 705, where input parameters are entered for use by the processor 625. At step 710, information is loaded from memory 250 to the processor 625. Memory 230 is described above with reference to FIGS. 2-5. The information loaded from memory 230 includes maps 212, word counts 214, word frequencies 216 and the regression function that was generated as described with reference to FIGS. 2-5.

During operation, the module 605 of the complex system executes at least one BIT 610-1. In general; however, the module 605 can execute a plurality of BITs 610-1 . . . 610-n. When the result of the BIT is a fail result, the BIT 610-1 generates BIT fault code data. Over time this BIT fault code data collectively makes up a new BIT fault code sequence 612. At step 720, the new BIT fault code sequence 612 is loaded at processor 625 of analysis via the prognostics module 630.

At step 730, the prognostics module 630 executes the regression function with respect to the new BIT fault code sequence 612. The prognostics module 630 applies the regression function (that was loaded from memory 230) to the new BIT fault code sequence 612, and generates a result 635 at step 735. The result 635 can be a no-fault found (NFF) result (i.e., an indicator that the new BIT fault code sequence was illegitimate and corrective action is needed), or a fault found (FF) result (i.e., an indicator that the new BIT fault code sequence is legitimate and corresponds to an actual fault condition that should be inspected further).

Method 700 then ends at step 740.

Those of skill would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for determining whether a built-in-test fault code (BITFC) data sequence generated by a built-in-test (BIT) of a particular module of a complex system is indicative of an actual fault condition, the method comprising:
   generating a regression function for the particular module based on stored built-in-test fault code (BITFC) data sequences generated by the BIT for the particular module and stored repair data for the particular module, wherein the regression function correlates some particular BITFC data sequences with a finding of an actual fault condition found (FF) result at the particular module, and correlates other particular BITFC data sequences with a finding of no fault condition found (NFF) result at the particular module;
   executing the BIT at the particular module during operation of the particular module to generate a new BITFC data sequence; and
   applying, at a processor, the regression function to the new BITFC data sequence to determine whether the new BITFC data sequence is indicative of an actual fault condition at the particular module or is indicative of a false fault condition at the particular module,
   wherein the step of generating a regression function, comprises:
      loading, from a fault history database, the stored BIT fault code data sequences generated by the BIT for the particular module and the stored repair data, wherein the stored repair data comprises actual fault condition found (FF) result data and no fault condition found (NFF) result data corresponding to the stored BIT fault code data sequences for the particular module, wherein the actual fault condition found (FF) result data indicates that a particular BIT fault code data sequence generated by the BIT corresponded to an actual fault condition found (FF) result, and wherein the no fault condition found (NFF) result data indicates that the particular BIT fault code data sequence generated by the BIT corresponded to a false alarm (NFF) result;
   processing the stored BIT fault code data sequences and the stored repair data to generate sorted words that are sorted by length and frequency, wherein each word corresponds to a plurality of symbols that are part of a symbol sequence, wherein each symbol is an identifier that corresponds to a particular BIT fault code, and wherein each word ranges between two and n symbols in length, where n is an integer;
   using the sorted words to generate feature vectors comprising a first feature vector for a first data class that corresponds to the no fault condition found (NFF) result data, and a second feature vector for a second data class that corresponds to actual fault condition found (FF) result data; and
   generating, based on the first and second feature vectors, the regression function.

2. A method according to claim 1, further comprising:
   storing the regression function in memory for subsequent use in analyzing the new BITFC data sequence.

3. A method according to claim 1, wherein the step of processing the stored BIT fault code data sequences and the stored repair data to generate sorted words that are sorted by length and frequency, comprises:
   determining unique BIT fault codes from the BIT fault code data sequences;
   mapping each unique BIT fault code to a corresponding symbol, wherein each symbol corresponds to a particular BIT fault code;
   converting the stored BIT fault code data sequences into a symbol sequence;
   segmenting the symbol sequence into subsets of words, wherein each subset of words comprises subsequences of identical symbol length, wherein the symbol length of each subsequence varies from two symbols to a maximum word length N, wherein the subsets collectively make up a collection of subsets, and wherein N is a whole number;
   counting a number of occurrences of words of each unique symbol length in the collection of subsets;
   generating word counts for each unique word, for each unique length from the collection of subsets;
   for each subset of words, sorting word counts by the number of occurrences of each word, in descending order, from the most frequently occurring words to the least frequently occurring words;
   converting the sorted word counts to sorted first word frequencies by dividing the sorted word counts by total number of words, wherein each first word frequency is the frequency of occurrence in each word of similar length in the current collection of sequences;
   converting the sorted word counts to sorted second word frequencies by dividing the sorted word counts by the total number of words, wherein each second word frequency is the frequency of occurrence in each word of similar length in the fault history database.

4. A method according to claim 3, wherein the step of segmenting, comprises:
segmenting the symbol sequence into sets of words, wherein each set of words includes words that comprise a particular number of consecutive symbols that are part of the symbol sequence, wherein the particular number is different in each set of words, and wherein the particular number of consecutive symbols in any word ranges between two for the second set of words and N, where N is the maximum word length specified as a number of symbols.

5. A method according to claim 3, wherein the step of sorting comprises:
for each set of words:
determining the number of occurrences of each word in the particular set of words to generate word counts for that set of words; and
arranging the word counts for that set of words in descending order from the most frequently occurring words to least frequently occurring words.

6. A method according to claim 3, further comprising the steps of:
comparing the first and second word frequencies for each word to a minimum word frequency threshold; and
discarding any words having a corresponding word frequency that is less than the minimum word frequency threshold to filter low frequency words from the symbol sequence.

7. A method according to claim 3, further comprising the steps of:
comparing a word complexity of each word to a word complexity threshold; and
discarding any words having a corresponding word complexity that is less than the word complexity threshold to filter low complexity words from the symbol sequence.

8. A method according to claim 1, wherein the step of using the sorted words to generate feature vectors, comprises:
concatenating sorted words that correspond to the first data class to generate the first feature vector that corresponds to no-fault condition found (NFF) result data; and
concatenating other sorted words that correspond to the second data class to generate the second feature vector that corresponds to actual fault condition found (FF) result data.

9. A method according to claim 1, wherein the step of generating, based on the first and second feature vectors, the regression function, comprises:
computing, based on the first feature vector, parameters for the regression function that predict likelihood of a no fault found (NFF) at the particular module when words of the first data class that correspond to particular BITFC data sequences indicative of no-fault condition found (NFF) result data are input to the regression function; and
computing, based on the second feature vector, other parameters for the regression function that predict likelihood of an actual fault condition at the particular module when words of the second data class that correspond to particular BITFC data sequences indicative of actual fault condition found (FF) result data are input to the regression function.

10. A method according to claim 1, wherein the step of applying the regression function to the new BITFC data sequence, comprises:
loading, at the processor, the new BITFC data sequence generated by the BIT at the particular module; and
executing the regression function at the processor with respect to the new BITFC data sequence to generate either:
a no-fault found (NFF) result that indicates that the new BITFC data sequence is not indicative of an actual fault condition at the particular module, or
a fault found (FF) result that indicates that the new BITFC data sequence is indicative of an actual fault condition at the particular module.

11. A method according to claim 1, wherein the complex system is an aircraft and wherein the particular module is an avionics module of the aircraft.

12. A method according to claim 1, wherein the built-in-test (BIT) is executed at the particular module to perform a particular diagnostic test with respect to that particular module to determine whether that particular module is operating correctly, and
wherein the BIT generates a BIT fault code when the particular module is determined not to be is operating correctly, and wherein the BITFC fault code data sequence comprises BIT fault codes generated by the BIT.

13. A method according to claim 1, wherein the regression function is a logistic regression function.

14. An analysis system for a complex system that includes a plurality of modules including a particular module that regularly executes a built-in-test (BIT) to determine whether that particular module is operating correctly, wherein the BIT generates a BIT fault code when the particular module is determined not to be is operating correctly, the analysis system comprising:
memory that stores BIT fault code (BITFC) data sequences comprising a BIT fault codes generated by the BIT and repair data for that module corresponding to the BITFC data sequences, wherein the repair data comprises actual fault condition found (FF) result data and no fault condition found (NFF) result data corresponding to the stored BIT fault code data sequences for the particular module;
a first processor that generates a regression function for the particular module based on the stored built-in-test fault code (BITFC) data sequences and the repair data for the particular module, wherein the regression function correlates some particular ones of the BITFC data sequences with a finding of an actual fault condition found (FF) result at the particular module, and correlates other particular ones of the BITFC data sequences with a finding of no fault condition found (NFF) result at the particular module; and
a second processor designed to load the regression function, load a new BITFC data sequence generated by the BIT at the particular module, and execute the regression function with respect to the new BITFC data sequence to generate either: a no-fault found (NFF) result that indicates that the new BITFC data sequence is not indicative of an actual fault condition at the particular module, or a fault found (FF) result that indicates that the new BITFC data sequence is indicative of an actual fault condition at the particular module,
wherein the first processor processes the stored BIT fault code data sequences and the repair data to generate sorted words that are sorted by length and frequency, wherein each word corresponds to a plurality of symbols that are part of a symbol sequence, wherein each symbol is an identifier that corresponds to a particular BIT fault code, and wherein each word ranges between two and n symbols in length, where n is an integer.

15. An analysis system according to claim 14, wherein the first processor uses the sorted words to generate feature vectors comprising a first feature vector for a first data class that corresponds to the no fault condition found (NFF) result data, and a second feature vector for a second data class that corresponds to actual fault condition found (FF) result data, and then generates the regression function based on the feature vectors.

16. An analysis system according to claim 14, wherein the first processor:
  maps each unique BIT fault code in the stored BIT fault code data sequences to a corresponding symbol to generate a symbol sequence based on the stored BIT fault code data sequences,
  segments the symbol sequence into sets of words, wherein each set includes words that comprise a different particular number of consecutive symbols of the symbol sequence,
  counts a number of occurrences of each word in the symbol sequence to generate word counts for each word, and then, for each set of words, sorts the word counts by the number of occurrences in descending order, and converts the sorted word counts to sorted word frequencies, wherein each word frequency is the frequency of occurrence of each word in the symbol sequence,
  concatenates sorted words that correspond to the first data class to generate the first feature vector that corresponds to no-fault condition found (NFF) result data, and concatenates other sorted words that correspond to the second data class to generate the second feature vector that corresponds to actual fault condition found (FF) result data,
  generates parameters for the regression function based on the first feature vector that predict likelihood of a no fault found (NFF) at the particular module when words of the first data class that correspond to particular BITFC data sequences indicative of no-fault condition found (NFF) result data are input to the regression function, wherein the no fault condition found (NFF) result data indicates that the particular BIT fault code data sequence generated by the BIT corresponded to a false alarm (NFF) result, and
  generates other parameters for the regression function based on the second feature vector that predict likelihood of an actual fault condition at the particular module when words of the second data class that correspond to particular BITFC data sequences indicative of actual fault condition found (FF) result data are input to the regression function, wherein the actual fault condition found (FF) result data indicates that a particular BIT fault code data sequence generated by the BIT corresponded to an actual fault condition found (FF) result.

* * * * *